United States Patent
Lindoff et al.

(10) Patent No.: US 12,425,065 B2
(45) Date of Patent: Sep. 23, 2025

(54) DIGITAL PRE-PROCESSING CHIP FOR mmWAVE TRANSCEIVER ARCHITECTURES

(71) Applicant: BEAMMWAVE AB, Lund (SE)

(72) Inventors: Bengt Lindoff, Bjärred (SE); Per-Olof Brandt, Lomma (SE); Jonas Lindstrand, Lund (SE); Stefan Svedberg, Lund (SE)

(73) Assignee: BEAMMWAVE AB, Lund (SE)

( * ) Notice: Subject to any disclaimer, the term of this patent is extended or adjusted under 35 U.S.C. 154(b) by 46 days.

(21) Appl. No.: 18/286,921

(22) PCT Filed: May 6, 2022

(86) PCT No.: PCT/EP2022/062231
§ 371 (c)(1),
(2) Date: Oct. 13, 2023

(87) PCT Pub. No.: WO2022/243060
PCT Pub. Date: Nov. 24, 2022

(65) Prior Publication Data
US 2024/0195448 A1    Jun. 13, 2024

(30) Foreign Application Priority Data

May 17, 2021   (EP) ..................................... 21174014

(51) Int. Cl.
*H04B 1/40* (2015.01)
*H04B 7/06* (2006.01)

(52) U.S. Cl.
CPC ............ *H04B 1/40* (2013.01); *H04B 7/0691* (2013.01)

(58) Field of Classification Search
CPC ................................ H04B 1/40; H04B 7/0691
See application file for complete search history.

(56) References Cited

U.S. PATENT DOCUMENTS 9,762,302 B1 * 9/2017 Shaked ................ H04B 7/0417
9,791,552 B1 * 10/2017 Schuman ............... H01Q 3/267
(Continued)

OTHER PUBLICATIONS

Extended European Search Report for European Application No. 21174014.7, dated Oct. 26, 2021.
(Continued)

*Primary Examiner* — Jaison Joseph
(74) *Attorney, Agent, or Firm* — MARSHALL, GERSTEIN & BORUN LLP

(57) ABSTRACT

A digital pre-processing chip is disclosed. The digital pre-processing chip comprises an analog interface for transmitting and receiving analog signals to and from a plurality of analog Radio Frequency (RF) chips, and a digital interface for transmitting and receiving digital signals to and from a baseband chip. The digital pre-processing chip further comprises a plurality of Analog-to-Digital Converters (ADCs) for converting a plurality of analog signals received via the analog interface to a plurality of RX digital signals, and a plurality of Digital-to-Analog Converters (DACs) for converting a plurality of TX digital signals to a plurality of analog signals to be transmitted to the plurality of analog RF chips via the analog interface. The digital pre-processing chip further comprises pre-processing circuitry configured to pre-process the plurality of RX digital signals received from the plurality of ADCs to form a pre-processed digital signal to be transmitted to the baseband chip via the digital interface. The pre-processing circuitry is further configured to pre-process a digital signal received via the digital interface to form the plurality of TX digital signals to be transmitted to the plurality of DACs.

13 Claims, 5 Drawing Sheets

(56) References Cited

U.S. PATENT DOCUMENTS

| | | | | |
|---|---|---|---|---|
| 2002/0171583 | A1* | 11/2002 | Purdy | H01Q 25/00 |
| | | | | 342/368 |
| 2009/0096653 | A1* | 4/2009 | Ahn | H04L 27/364 |
| | | | | 341/155 |
| 2009/0213275 | A1* | 8/2009 | Trager | H04N 5/44 |
| | | | | 370/476 |
| 2014/0146861 | A1* | 5/2014 | Li | H04B 1/40 |
| | | | | 375/219 |
| 2017/0346182 | A1* | 11/2017 | Martikkala | H01Q 3/267 |
| 2018/0219587 | A1* | 8/2018 | Huo | H04B 1/40 |
| 2019/0089434 | A1* | 3/2019 | Rainish | H04B 7/086 |
| 2024/0195448 | A1* | 6/2024 | Lindoff | H04B 1/40 |

OTHER PUBLICATIONS

International Search Report and Written Opinion for International Application No. PCT/EP2022/062231, mailed Aug. 25, 2022.

\* cited by examiner

DIGITAL PRE-PROCESSING CHIP FOR mmWAVE TRANSCEIVER ARCHITECTURES

CROSS-REFERENCE TO RELATED APPLICATION

This present application is the US national phase of International Patent Application No. PCT/EP2022/062231, filed May 6, 2022, which claims priority to European Application No. 21174014.7, filed May 17, 2021. These applications are hereby incorporated by reference in their entireties.

TECHNICAL FIELD

The present disclosure relates generally to the field of multi-antenna transceiver systems, and in particular to digital pre-processing chips for multi-antenna transceiver architectures.

BACKGROUND

Wireless communication is expanding to new radio spectrum parts in order to meet the requirements for higher data rates. For example, the newly defined fifth generation (5G) new radio (NR) standard not only introduces new services (e.g., low latency high reliability services), but also supports increased capacity and higher data rates.

To facilitate capacity increase, NR introduces wireless communication on millimeter wavelength (mmW) radio frequencies (e.g., frequency bands above 10 GHz, such as the 28 GHz frequency band or the 39 GHz frequency band). Due to the fact that mmW radio frequencies typically entail higher path loss than lower frequency signalling, cells of a mmW cellular wireless communication system will typically cover smaller areas than those of a lower frequency communication system. Therefore, communication devices supporting 5G NR in the mmW frequency range will typically support also wireless communication using lower frequencies (e.g., below 6 GHz) for coverage.

One advantage with mmW transmission is that the short wavelength enables use of small antennas, which in turn makes it possible to have massive-MIMO transceiver arrangements comprised in small (e.g., handheld) wireless communication devices. For example, it may be possible to fit antenna panels with, e.g., 4×2 antennas in a module having a size of approximately 25×16 mm. This advantage enables application of beamforming for mmW, which may significantly increase the cellular capacity and/or coverage. Transceiver architectures for Massive MIMO and beamforming are generally realized in two different ways—analog and digital beamforming. However, in some applications hybrid beamforming is employed, which may be understood as a combination of the two.

There is however a need for new solutions that mitigate, alleviate, or eliminate one or more of the deficiencies in the art.

SUMMARY

It is therefore an object of the present disclosure to provide a digital pre-processing chip, a multi-antenna transceiver system, a network node comprising such a multi-antenna transceiver system, and a wireless device comprising such a multi-antenna transceiver system, which seek to mitigate, alleviate, or eliminate one or more of the deficiencies in the art and disadvantages singly or in any combination.

This object is achieved by means of a digital pre-processing chip, a multi-antenna transceiver system, a network node comprising such a multi-antenna transceiver system, and a wireless device comprising such a multi-antenna transceiver system as defined in the appended claims. The term exemplary is in the present context to be understood as serving as an instance, example or illustration.

In accordance with a first aspect of the present disclosure, there is provided a digital pre-processing chip comprising an analog interface for transmitting and receiving analog signals to and from a plurality of analog Radio Frequency (RF) chips, and a digital interface for transmitting and receiving digital signals to and from a baseband chip. The digital pre-processing chip further comprises a plurality of Analog-to-Digital Converters (ADCs) for converting a plurality of analog signals received via the analog interface to a plurality of RX digital signals, and a plurality of Digital-to-Analog Converters (DACs) for converting a plurality of TX digital signals to a plurality of analog signals to be transmitted to the plurality of analog RF chips via the analog interface. The digital pre-processing chip further comprises pre-processing circuitry configured to pre-process the plurality of RX digital signals received from the plurality of ADCs to form a pre-processed digital signal to be transmitted to the baseband chip via the digital interface. The pre-processing circuitry is further configured to pre-process a digital signal received via the digital interface to form the plurality of TX digital signals to be transmitted to the plurality of DACs.

In accordance with another aspect of the present disclosure, there is provided multi-antenna transceiver system comprising a plurality of analog RF chips, a baseband chip, and at least one digital pre-processing chip according to any one of the embodiments disclosed herein. More specifically, each digital pre-processing chip is configured to transmit and receive analog signals to and from a set of the plurality of analog RF chips via the analog interface, and to transmit and receive digital signals to and from the baseband chip via the digital interface.

With this aspect of the disclosure, similar advantages and preferred features are present as in the previously discussed first aspect of the disclosure.

In accordance with yet another aspect of the present disclosure, there is provided a network node comprising a multi-antenna transceiver system according to any one of the embodiments disclosed herein. With this aspect of the disclosure, similar advantages and preferred features are present as in the previously discussed first aspect of the disclosure.

In accordance with yet another aspect of the present disclosure, there is provided a wireless communication device comprising a multi-antenna transceiver system according to any one of the embodiments disclosed herein. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Figure 1:
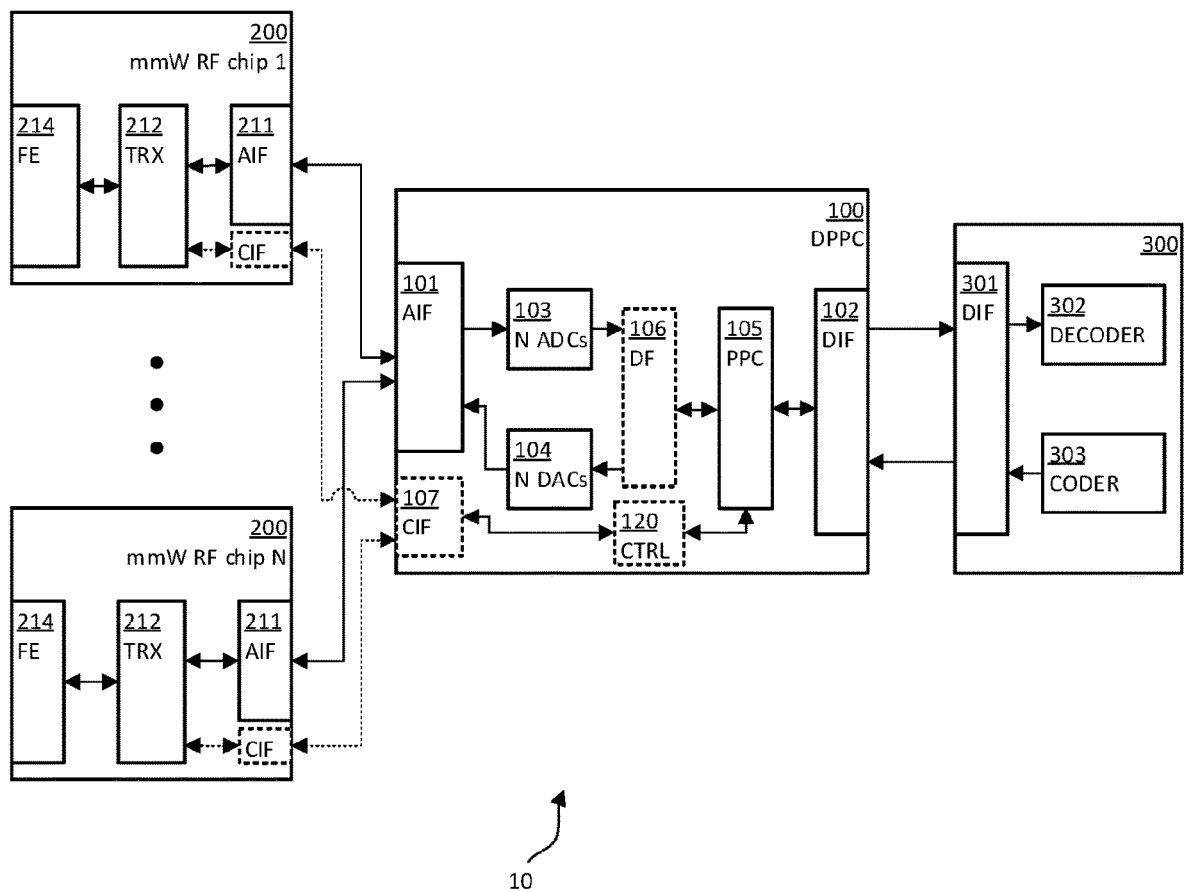
FIG. 1 is a schematic block diagram representation of a multi-antenna transceiver system in accordance with an embodiment of the present disclosure.

Aspects of the present disclosure will be described more fully hereinafter with reference to the accompanying drawings. The control device and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not necessarily intended to limit the scope. As used herein, the singular forms "a", "an" and "the" are intended to include the plural forms as well, unless the context clearly indicates otherwise.

Those skilled in the art will appreciate that the steps, services and functions explained herein may be implemented using individual hardware circuitry, using software functioning in conjunction with a programmed microprocessor or general purpose computing device, using one or more Application Specific Integrated Circuits (ASICs) and/or using one or more Digital Signal Processors (DSPs).

Also generally, when an antenna element is referred to herein, it may be a constituent antenna of a multi-antenna arrangement (e.g., an antenna array, and antenna matrix, an antenna panel, etc.), for example.

Furthermore, when a functional unit of a transceiver chain is referred to herein (e.g., ADC, DAC, frequency converter, mixer, filter, etc.), it should be understood that such reference may include a pair of functional units for in-phase/quadrature processing.

Multi-antenna transceivers may be used for multiple-input multiple-output (MIMO; e.g., massive MIMO or traditional MIMO) communication and/or for beamformed communication (e.g., transmission pre-coding and/or reception combining). In such applications, the baseband content is typically the same for some (e.g., all) transceiver chips, while the transmitted/received signals typically differ between antenna elements. Thus, the baseband processing may typically comprise processing of a radio signal which is simultaneously received or transmitted by the different antenna elements, on the same carrier frequency.

The multi-antenna transceiver systems and digital pre-processing chips presented herein, or part thereof, may be particularly suitable for massive MIMO and/or beamforming. Moreover, any of the multi-antenna transceiver systems and digital pre-processing chips as described herein may be used in (e.g. comprised in, included in, etc.) any suitable communication apparatus. Example suitable communication apparatuses include network nodes (e.g. base stations, access points (APs), fixed wireless access (FWA) units, Large intelligent surfaces (such as for instance "Radio-Weaves"), non-terrestrial transceivers— such as satellites or unmanned aerial vehicles (UAVs), and so forth) and wireless communication devices (e.g. user equipment (UE), station (STA), Internet of Things (IOT) devices, and so forth).

As mentioned, general transceiver architectures for massive MIMO and/or beamforming may be implemented using analog multi-antenna control, digital multi-antenna control, or hybrid multi-antenna control.

Analog beamforming is typically performed at the Radio Frequency (RF) chip through a bank of phase shifters, one per antenna element, and an analog power combiner (receiver) and power splitter (transmitter). The beam direction of the combined radio signal of the antenna array can by controlled by tuning the phase shifters. Different, or the same, directions may be applied for transmission and reception. This architecture only requires one pair of analog-to-digital converters (ADC) and digital-to-analog converters (DAC) at the receiver and transmitter, respectively, reducing the complexity. The antenna elements are typically clustered and implemented in an antenna panel.

A disadvantage with analog beamforming is that the antenna array can only apply a single (transmit and/or receive) beam at the same time. This leads to that simultaneous multi-user scenarios are not possible. Furthermore, abrupt changes of channel conditions (e.g., due to blocking of antennas, rotation of the transceiver, etc.) are hard to track with a single beam limitation. Thus, there is a high risk of signal outage in connection to abrupt changes of channel conditions.

Digital beamforming may provide increased flexibility compared to analog beamforming. In digital beamforming implementations, the beamforming is typically performed in the digital baseband (BB) chip. Each transceiver chain has a pair of ADCs at the receiver and DACs at the transmitter enabling the transceiver to simultaneously direct beams in, theoretically, an infinite number of directions at a given time. Thereby, several beams can be tracked simultaneously and it may be possible to follow fast changes of channel conditions, thereby improving receiver and/or transmitter performance. Moreover, digital beamforming provides advantages from a flexibility of antenna placement point of view, especially in handheld devices, where the antennas generally need to be distributed over the device in order to combat blocking of the mmWave radio signals caused by e.g. hand-placement while handling the device.

Furthermore, some digital beamforming architectures comprise multiple (N) analog mmW RF chips or modules that are connected to a baseband chip via an analog interface. Each analog mmW RF chip comprises one or more antennas, front-end receiver (RX) and front-end transmitter (TX), as well as an analog baseband receiver and transmitter filter. The output analog baseband signal (from each mmW RF chip) is input to each of the N inputs of the baseband chip. The baseband chip is accordingly provided with N ADCs/DACs and suitable pre-processing and coding/decoding circuitry.

However, other digital beamforming architectures utilize a digital interface between the N number of mmW RF chips and the baseband chip. In contrast to the analog interface realization, in the digital interface realization some of the circuitry (e.g. ADCs, DACs, and digital filters) is provided in the mmW RF chips instead of the baseband chip. Accordingly, the output from each mmW RF chip is a digital signal over the digital interface, which is provided to the inputs of the baseband chip, which comprises the pre-processing circuitry and the coding/decoding circuitry.

The analog interface realization for digital beamforming architectures is advantageous over the digital interface realization in terms of power consumption; however, it is disadvantageous in terms of flexibility in the interface signal processing. Moreover, both alternatives still suffer drawbacks in applications where there is a relatively high number of antenna elements in a single device as there is a challenge in routing all of the interface connections from the mmW RF chips to the baseband chip, particularly in applications where the antennas are distributed over the device. For example, routing 16 or 64 interfaces on an already crowded Printed Circuit Board (PCB) may be an unsurmountable task in some cases.

Another problem is that baseband chips therefore may be developed to cover a wide range of mmW devices, wherefore the design of the pin output/input is chosen to accommodate the highest number of mmW RF chip scenario. For instance, a fixed wireless device (e.g. network node) may have 64 mmW RF chips while a handheld device (e.g. a smartphone) may have 16 mmW RF chips. Thus, the baseband chip may therefore be oversized in the handheld device application, thereby adding unnecessary cost and size.

In short, there is herein presented a digital pre-processing chip—and in extension a multi-antenna transceiver system— where the conventional architecture of a single baseband chip with a plurality of millimetre wave (mmW) RF chips are replaced with a "partitioned" architecture. In more detail, the herein proposed mmW transceiver architecture aims to exploit at least some of the advantages of the analog and digital interface realizations for digital beamforming architectures mentioned above, while attempting to mitigate all or at least some of the disadvantages of the two.

It is therefore proposed herein, to "partition" the traditional two segments (mmW RF chips and baseband chip) of a multi-antenna transceiver architecture, into three segments (mmW RF chips, one or more digital pre-processing chips, and a baseband chip). Here, the digital pre-processing chip is connected to the mmW RF chips via an analog interface and to the baseband chip via a digital interface.

An advantage with a digital pre-processing chip in accordance with some embodiments, is that an optimized radio transceiver architecture in terms of size and cost may be achieved for various sorts of devices, in particular devices containing between 2 and 256 analog RF chips.

An advantage with a digital pre-processing chip in accordance with some embodiments, power consumption associated with the chip-interfaces may be optimized by allowing for many low power analog interfaces towards the analog RF chips, and few (higher power) digital interfaces towards the baseband chip.

An advantage with a digital pre-processing chip in accordance with some embodiments is that the digital pre-processing chip decouples the analog RF chips from the baseband chip, thereby potentially allowing for flexible and independent design of the respective transceiver chip and baseband chip.

An advantage with a digital pre-processing chip in accordance with some embodiments, is that by including pre-processing functions such as e.g. channel estimation, beam tracking, RF calibration and/or FFTs in the digital pre-processing chip reduces the signalling and information transfer between the digital pre-processing chip and the baseband chip, thereby potentially further reducing power consumption associated with the chip-interfaces.

An advantage with a digital pre-processing chip in accordance with some embodiments, is that RF calibration control signalling between the digital pre-processing chip and the analog RF chips may optimize transceiver power consumption and/or transceiver performance, and thereby longer use time and improved user experience may be achieved.

FIG. 1 is a schematic block diagram illustrating a multi-antenna transceiver system 10 in accordance with some embodiments of the present disclosure. The multi-antenna transceiver system 10 comprises a plurality of analog radio frequency (RF) chips 200, a baseband chip (BBC) 300, and a digital pre-processing chip (DPPC) 100. The digital pre-processing chip 100 is arranged or configured to transmit and receive analog signals to and from the plurality of analog RF chips 200 via an analog interface 101. The digital pre-processing chip 100 is further arranged or configured to transmit and receive digital signals (see e.g. ref. 23 in FIG. 2) to and from the baseband chip 300 via a digital interface 102.

Figure 2:
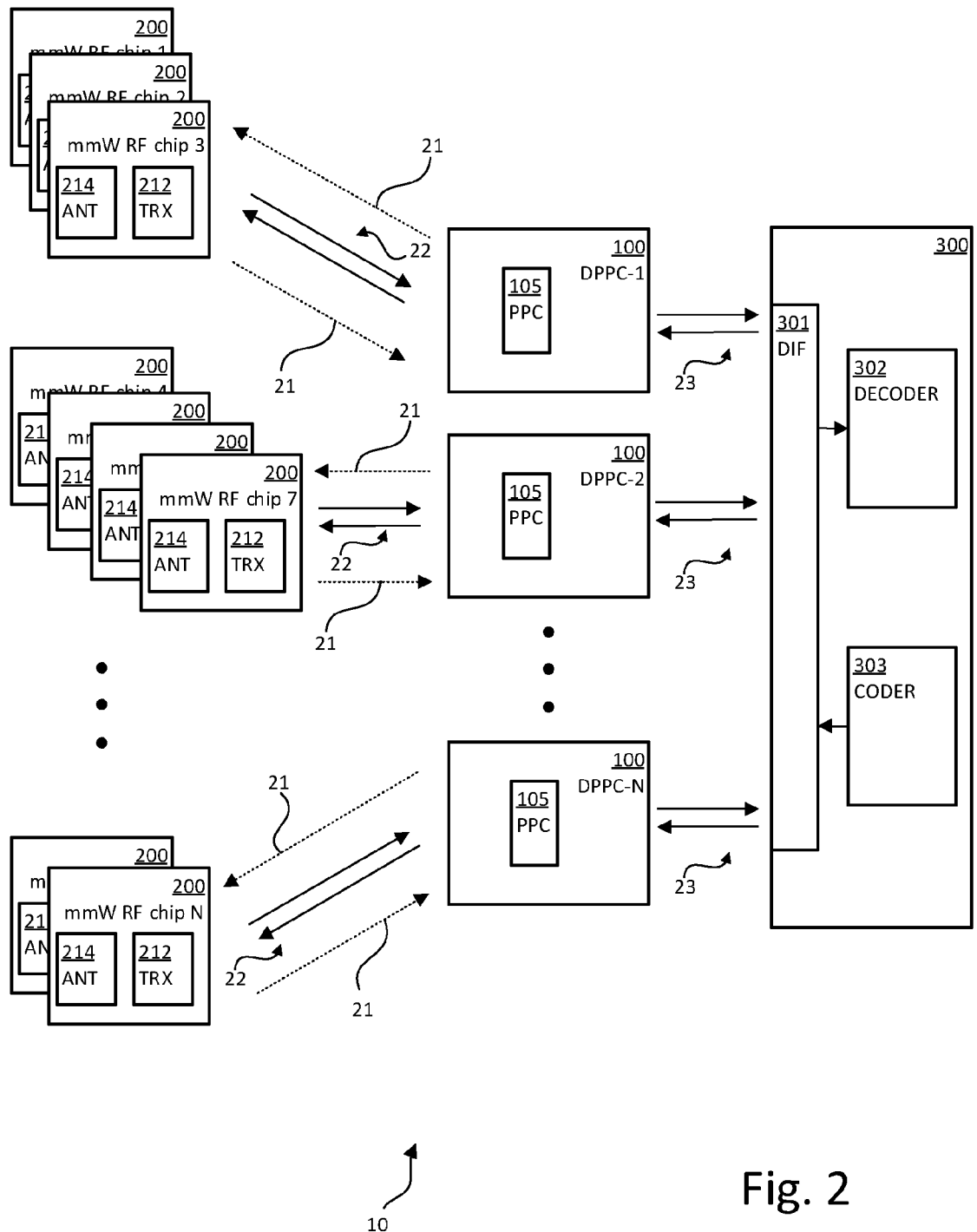
FIG. 2 is a schematic block diagram representation of a multi-antenna transceiver system in accordance with an embodiment of the present disclosure.

It should be noted the multi-antenna transceiver system 10 may comprise a plurality of digital pre-processing chips 100 as for example illustrated in FIG. 2, which shows a schematic block diagram illustrating a multi-antenna transceiver system 10 in accordance with some embodiments. Each digital pre-processing chip 100 may accordingly be associated with a (sub)-set of analog RF chips 200 out of the plurality of analog RF chips 200. A "set" is in the present context to be understood as "one or more" or "at least one". Thus, each DPPC 100 out of the plurality of DPPCs may be associated with a different number of analog RF chips. This may for example be advantageous for handheld devices, where the antennas or antenna elements need to be distributed across the handheld device in order to combat blocking of the mmWave radio signals due to hand placement. In more detail, in this "distributed" arrangement, the DPPCs are accordingly arranged in (close) proximity to the associated analog RF chips, thereby at least partly alleviating the problem of routing the plurality of analog baseband signals from the analog RF chips 200 (that are distributed across the entire device) to the baseband chip 300.

Moving on, each analog RF chip 200 is illustrated with an example architecture comprising a front end (FE) 214, a receiver path (RX) and a transmitter path (TX) illustrated under a common transceiver path (TRX) 212, and an analog interface (AIF) 211. The analog RF chips are preferably analog mmWave RF chips (i.e. configured to receive and transmit radio signals in the mmWave range). The analog interface 211 is for connection to the digital pre-processing chip 100 and may comprise any suitable functional and/or physical components as known in the art. The output from each of the analog RF chips 200 via the analog interface 211 is preferably an analog baseband signal (see e.g. ref 22 in FIG. 2), typically, but not limited to, a baseband bandwidth below 1 GHz. For example, the output from each of the analog RF chips 200 via the analog interface 211 may be an analog baseband signal in the range of 200-800 MHz.

The transceiver (TRX) paths 212 of the analog RF chips 200 may generally comprise any suitable functional and/or physical components. In more detail, the receiver (RX) path of each analog RF chip 200 may for example comprise a low noise amplifier (LNA), mixer circuitry (for down-conversion), a local oscillator (LO), one or more filters (e.g., a low-pass analog filter), a variable gain amplifier, and so forth. The transmitter (TX) path may for example comprise one or more filters (e.g., a low-pass analog filter), mixer circuitry (for up-conversion), a local oscillator a power amplifier (PA), and so forth. The front end 214 may be for connection to one or more antenna elements, or may comprise one or more on-chip antenna elements. Thus, each analog RF chip 200 of the multi-antenna transceiver system 10 is associated with one or more corresponding antenna elements. The front end 214 may comprise any suitable functional and/or physical components.

The baseband chip 300 is configured to transmit and receive digital signals (see e.g. ref. 23 in FIG. 2) to and from the DPPC 100 via corresponding digital interfaces 102, 301, which may be in the form of a Serializer/Deserializer (SerDes) interfaces (such as e.g. 8b/10b SerDes, bit interleaved SerDes, and Embedded clock SerDes). However, in some embodiments, the digital interfaces may be in the form of a System Packet Interface Level 3 (SPI-3), a SPI-4.2 interface, or a common electrical I/O (CEI) interface. The digital interfaces may be configured based on the context of system usage, and specifications associated thereto, such as e.g. signal integrity, system flexibility, and power consumption.

The baseband chip 300 further comprises decoding circuitry 302 and coding circuitry 303 configured to decode the received signals from the DPPC 100 and code information to be transmitted to the DPPC 100, respectively. The coding and decoding circuitry may for example be configured for performing turbo-coding/decoding, low-density parity-check (LDPC) coding/decoding, convolutional coding/decoding, or any other suitable coding technique as readily understood by the skilled artisan.

The digital pre-processing chip (DPPC) 100 comprises an analog interface (AIF) 100 for transmitting and receiving analog signals (see e.g. ref 22 in FIG. 2) to and from the plurality of analog RF chips 200, and a digital interface 102 for transmitting and receiving digital signals (see e.g. ref. 23 in FIG. 2) to and from the baseband chip. The DPPC 100 further has a plurality of Analog-to-Digital converters (ADCs) 103 for converting a plurality of analog signals received via the analog interface 101 to a plurality of RX digital signals. The DPPC further has a plurality of Digital-to-Analog Converters (DACs) 104 for converting a plurality of TX digital signals to a plurality of analog signals (see e.g. ref. 22 in FIG. 2) to be transmitted to the plurality of analog RF chips 200 via the analog interface 101. It should be noted that the terms "RX" digital signals and "TX" digital signals are merely used to facilitate the understanding of the terminology herein by, for example, highlighting the different signals paths within the system, and the terms should not necessarily be construed as limiting or in any other way adverse to the scope of the appended claims.

Furthermore, even though the figures, such as FIG. 1, may indicate that the number of ADCs 103 and DACs 104 (the number being represented by the positive integer N) equals the number of analog RF chips 200 connected to the digital pre-processing chip 100, it is however to be understood as one example embodiment out of several. Thus, in some embodiments the number of ADCs 103 and DACs 104 comprised by the digital pre-processing chip 100 equals the number of analog RF chips 200 connected to the digital pre-processing chip 100.

However, in some embodiments, the number of ADCs 103 and DACs 104 comprised by the digital pre-processing chip 100 is twice the number of analog RF chips 200 connected to the digital pre-processing chip 100. Thus, if the DPPC 100 is connected to N analog RF chips 200, the DPPC may comprise 2N ADCs 103 and 2N DACs, where N is a positive integer ≥1. However, in some embodiments N is a positive integer ≥2. This may for example be the case when each analog RF chip 200 is associated with a single antenna/transceiver (TRX), and the DPPC 100 is configured to send and receive an in-phase and a quadrature-phase signal over the analog interface 101. In other words, each analog RF chip 200 is associated with a pair of ADCs 103 and a pair of DACs for in-phase and quadrature conversion.

Moreover, in some embodiments, the number of ADCs 103 and DACs 104 comprised by the digital pre-processing chip 100 is four times the number of analog RF chips 200 connected to the digital pre-processing chip 100. Thus, if the DPPC 100 is connected to N analog RF chips 200, the DPPC may comprise 4N ADCs 103 and 2N DACs, where N is a positive integer ≥1. However, in some embodiments N is a positive integer ≥2. This may for example be the case if each analog RF chip 200 comprises two antenna elements/transceivers—e.g. one transceiver for each polarization of the antenna— and the DPPC 100 is configured to send and receive an in-phase and a quadrature-phase signal over the analog interface 101. In other words, each analog RF chip 200 is associated with two pairs of ADCs 103 and two pairs of DACs for in-phase and quadrature conversion, each pair being associated with a respective antenna polarization.

Thus, in the context of the present disclosure, the "plurality" of analog RF chips 200 and the "plurality" of ADCs 103 and DACs 104 may represent the same number or different numbers as exemplified in the foregoing.

Moving on, the digital pre-processing chip 100 further comprises pre-processing circuitry (PPC) 105 configured to pre-process the plurality of RX digital signals received from the plurality of ADCs 103 to form a pre-processed digital signal to be transmitted to the baseband chip 300 via the digital interface 102. The pre-processing circuitry 105 is further configured to pre-process a digital signal received via the digital interface 102 so to form the plurality of TX digital signals to be transmitted to the plurality of DACs 104. In some embodiments, the PPC 105 comprises down-sampling circuitry (not shown) configured to down-sample the plurality of RX digital signals and/or up-sampling circuitry (not shown) configured to up-sample the plurality of TX digital signals.

Further, in some embodiments, the digital pre-processing chip 100 further comprises digital filtering circuitry (DF) 106. The digital filtering circuitry is configured to apply digital filtering on the plurality of RX digital signals received from the plurality of ADCs 103, and to apply digital filtering on the plurality of TX digital signals to be transmitted to the plurality of DACs 104. In other words, the DPPC 100 may comprise a set of digital filters 106 arranged between the pre-processing circuitry 105 and the ADCs/DACs 103, 104. However, in some embodiments, the pre-processing circuitry 105 comprises the digital filtering circuitry (DF) 106. In other words, the DF 106 may be included in (or a part of) the PPC 105.

Further, in some embodiments, the digital pre-processing chip 100 comprises control circuitry 120 and a control interface 107. The control circuitry 120 may accordingly be configured to transmit control signals (see e.g. ref. 21 in FIG. 2) to the plurality of analog RF chips 200 (i.e. to the set of analog RF chips 200 associated with the DPPC 100) via the control interface. The control interface may comprise a digital interface and/or a Serial-to-Parallel (SPI) interface. The control signals may for example be used to transmit RF calibration information to the analog RF chips 200. The RF calibration information may for example be configured/determined by the pre-processing circuitry 105 and transmitted to the control circuitry 120, which in turn is configured to transmit control signals 21 indicative of the calibration information to the analog RF chips 100.

The control circuitry 120 may further be configured to transmit control signals to the plurality of analog RF chips 200 via the control interface at (pre)defined time slots. For example, the control signals may be transmitted during time slots related to pilot transmission/reception. In some embodiments, the transmitted control signals are indicative of at least one of a carrier frequency, a band selection, transmit or receive functions, bias control and frequency control for individual transceiver blocks 212, gain control for transmitters (TX) and receivers (RX) of the transceiver blocks 212, and bandwidth control for transmitter (TX) and receiver (RX) filtering. Further examples and details with respect to the control signalling is provided are provided in reference to FIG. 4 below.

Figure 3:
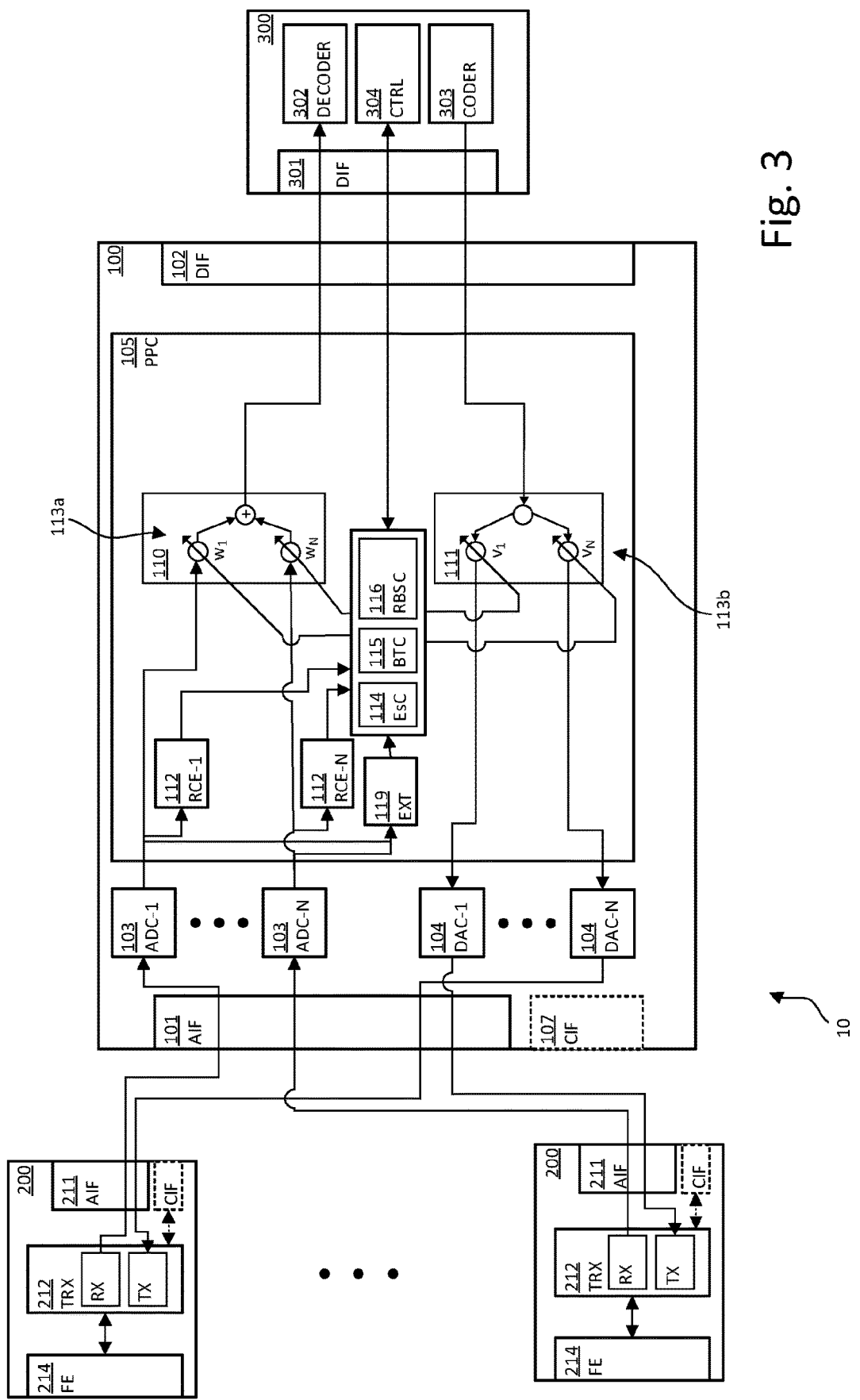
FIG. 3 is a schematic block diagram representation of a multi-antenna transceiver system in accordance with an embodiment of the present disclosure.
Figure 4:
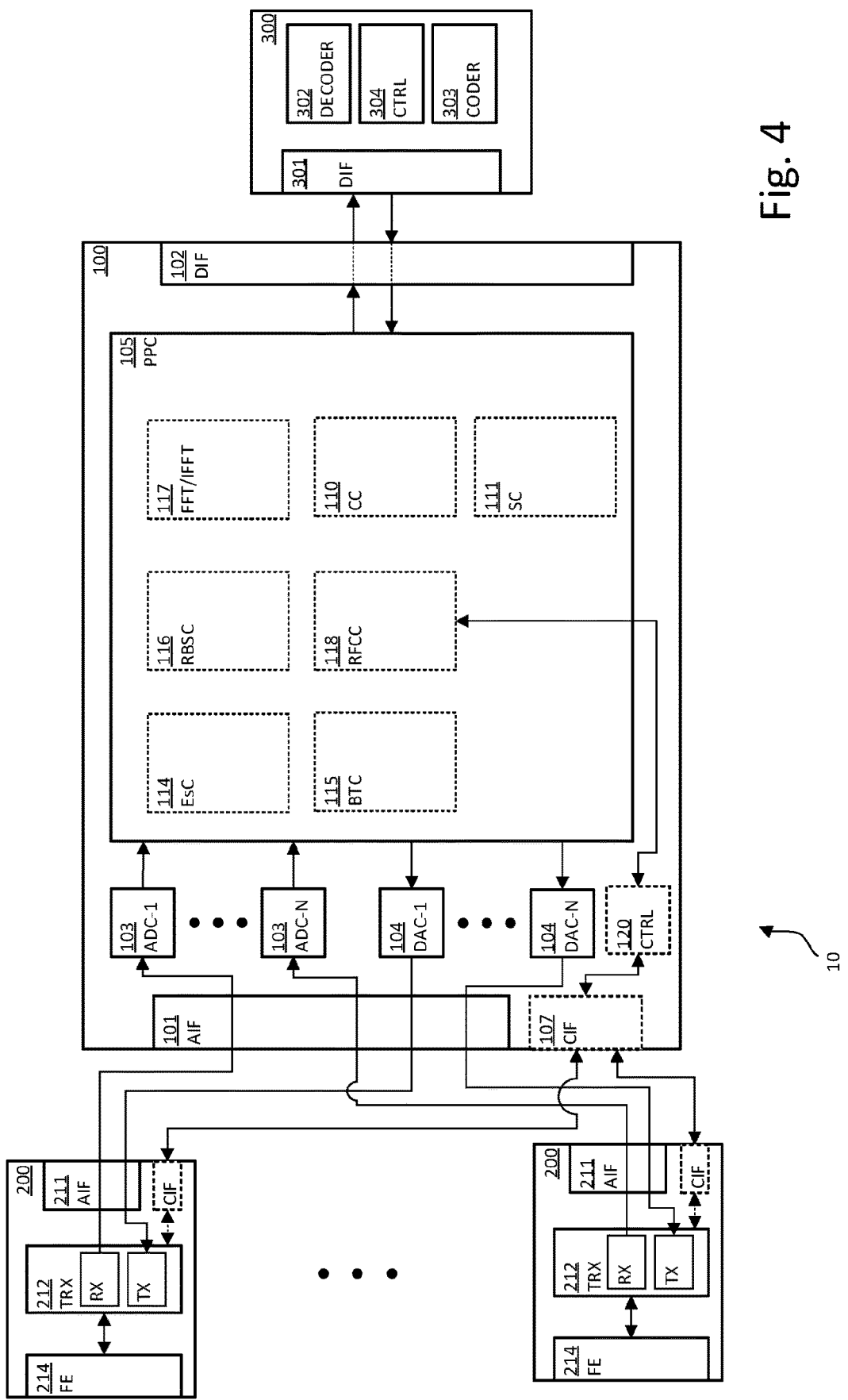
FIG. 4 is a schematic block diagram representation of a multi-antenna transceiver system in accordance with an embodiment of the present disclosure.
Figure 5:
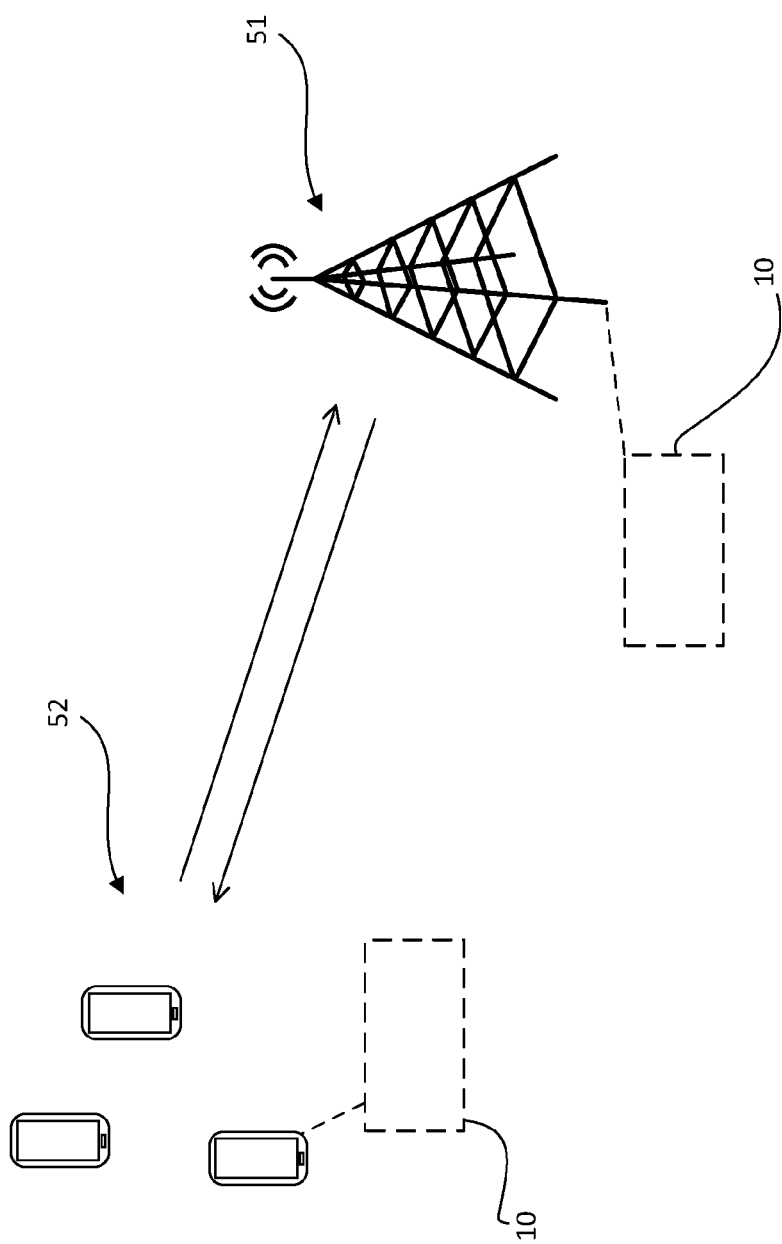
FIG. 5 is a schematic drawing illustrating a network node and a set of wireless communication devices, each of which comprises a multi-antenna transceiver system in accordance with an embodiment of the present disclosure.

Turning to FIGS. 3 and 4, which illustrate schematic block diagram representations of a multi-antenna transceiver system 10 in accordance with some embodiments. Analogously to the embodiments discussed in reference to FIG. 1, the multi-antenna transceiver system 10 comprises a plurality of analog radio frequency (RF) chips 200, a baseband chip (BBC) 300, and a digital pre-processing chip (DPPC) 100. The digital pre-processing chip 100 is arranged or configured to transmit and receive analog signals to and from the plurality of analog RF chips 200 via an analog interface 101. The digital pre-processing chip 100 is further arranged or configured to transmit and receive digital signals (see e.g. ref. 23 in FIG. 2) to and from the baseband chip 300 via a digital interface 102.

Further, in accordance with some embodiments, the DPPC 100 has pre-processing circuitry (PPC) 105 comprising combining circuitry 110 configured to combine the plurality of RX digital signals received from the plurality of ADCs to form the pre-processed digital signal. The pre-processing circuitry 105 further comprising splitting circuitry 111 configured to split the digital signal received via the digital interface to the plurality of TX digital signals to be transmitted to the plurality of DACs.

As mentioned in the foregoing, the RF chips 200 may comprise polarized antenna elements, e.g. one or more vertically polarized antenna elements and one or more horizontally polarized antenna elements. Thus, in accordance with some embodiments, the RX digital signals of a first subset of RX digital signals originated from radio signals received with vertical polarized antennas are combined and the RX digital signals of a second subset of RX digital signals originated from radio signals received with horizontal polarized antennas are combined. In such embodiments the DPPC 100 comprises pre-processing circuitry (PPC) 105 comprising combining circuitry 110 configured to combine the first subset of RX digital signals received with vertical polarized antennas to form a first pre-processed digital signal, and configured to combine the second subset of RX digital signals received with horizontal polarized antennas to form a second pre-processed digital signal. The pre-processing circuitry 105 may further comprise splitting circuitry 111 configured to split a digital signal received via the digital interface 102 to a first plurality of TX digital signals to be transmitted via the vertical polarized antennas, and a second plurality of TX digital signals to be transmitted via the horizontal polarized antennas.

Moreover, in some embodiments, the transceiver system 10 comprises a plurality of subsets of analog RF chips forming the plurality of analog RF chips 200 connected to a DPPC 100. In other words, each DPPC 100 may be connected to a first subset of analog RF chips 200 and to a second subset of analog RF chips 200, each subset comprising one or more analog RF chips 200. The "partitioning" of the plurality of RF chips 200 connected to the DPPC 100 to multiple subsets may for example be utilized when the transceiver system 10 is configured for carrier aggregation or dual connectivity.

In more detail, a first subset of the analog RF chips 200 may be configured to operate on a first carrier frequency, and a second subset of the RF chips 200 may be configured to operate on a second carrier frequency. Moreover, each of the first and second subsets of RF chips 200 may be associated with a corresponding set of ADCs 103 and DACs 104 of the DPPC 100.

Accordingly, the combining circuitry 110 may be configured to perform a first combining of the plurality of RX digital signals received from the plurality of ADCs 103 associated with the first subset of RF chips in order to form a first pre-processed digital signal. Moreover, the combining circuitry may be configured to perform a second combining of the plurality of RX digital signals received from the plurality of ADCs 103 associated to the second subset of analog RF chips 200 of to form a second pre-processed digital signal.

Moreover, in some embodiments, the pre-processing circuitry 105 further comprises splitting circuitry 111 configured to perform a first splitting of the digital signal received via the digital interface 102 to the a first plurality of TX digital signals to be transmitted to the plurality of DACs 104 associated to the first subset of analog RF chips 200. Moreover, the splitting circuitry 111 may be configured to perform a second splitting of the digital signal received via the digital interface to a second plurality of TX digital signals to be transmitted to the plurality of DACs 104 associated to the second subset of analog RF chips 200. Hence, the digital interface 102 may in some embodiments, comprise two RX streams and two TX streams, each pair of RX/TX streams being associated with a respective first and second carrier frequency. An advantage of allocating a first and second subset of analog RF chips 200 and combining/splitting the signals for a respective subset in the DPPC 100 simplifies the general transceiver design for carrier aggregation or dual connectivity operation.

Still further, in some embodiments, the pre-processing circuitry 105 further has a first scaling circuitry 113a configured to perform a first (complex valued) scaling ($w_i$, where $i=1, 2, \ldots, N$) of the plurality of RX digital signals received from the plurality of ADCs. The pre-processing circuitry may further comprise a second scaling circuitry 113b configured to perform a second (complex-valued) scaling ($v_i$, where $i=1, 2, \ldots, N$) of the plurality of TX digital signals. Moreover, in some embodiments the first scaling is different from the second scaling (i.e. $w_i \neq v_i$). However, in some embodiments, the first scaling is the same as the second scaling (i.e. $w_i = v_i$).

In other words, the pre-processing circuitry 105 is configured to combine the plurality of received digital signals to a combined digital signal output to the baseband chip 300.

The combination may be done for respective in-phase and quadrature-phase component (not shown). The pre-processing circuitry 105 may also be configured to split a digital signal received from the baseband chip 300 to a plurality of transmitted digital signals to be fed via the DACs 104 to the analog RF chips 200. Similarly, the splitting may be separate for respective in-phase and quadrature-phase signals. The pre-processing circuitry 105 may further also perform a complex-valued scaling of the respective digital signals output from the respective ADC 103, as well as perform a complex-valued scaling on respective split digital signal input to the respective DAC 104. The scaling may be the same on both receiver side and transmitter side, i.e. receiver input i and transmit output i is scaled with the same factor $w_i$. However, in other embodiments the scaling may be different.

In some embodiments the pre-processing circuitry 105 includes/comprises an extractor unit (may also be referred to as extractor circuitry— EXT) 119 configured to extract a subset of the plurality of RX digital signals from the ADCs 103. The extracted subset may correspond to reference signals such as synchronization signals (in a synchronization signal block, SSB), reference symbols, such as channel state information reference symbols (CSI-RS) or demodulation reference signals (DM-RS). The extracted subset of the received plurality of RX digital signals is transmitted together with the pre-processed digital signal(s) to the baseband chip 300 via the digital interface 102.

Further, in some embodiments, the pre-processing circuitry 105 further comprises estimating circuitry (EsC) 114 configured to obtain at least one (complex valued) scaling factor, and to estimate/determine the first scaling and the second scaling based on the obtained at least one (complex valued) scaling factor. The term obtain as used herein is to be interpreted broadly and encompasses receive, retrieve, collect, acquire, and so forth.

The pre-processing circuitry 105 may further comprise radio channel estimating circuitry (RCE) 112 configured to estimate a radio channel for a respective RX digital signal obtained from the plurality of ADCs 103. The estimating circuitry 114 may accordingly be configured to estimate/determine the one or more scaling factors based on the estimated radio channels. Moreover, the estimating circuitry 114 may be further configured to transmit the estimated/determined one or more scaling factors and/or the estimated radio channels to the baseband chip 300 via the digital interface 102. The baseband chip 300 may accordingly be configured to utilize the estimated/determined one or more scaling factors and/or the estimated radio channels in the coding and decoding processes.

However, in some embodiments, the one or more scaling factors are determined by control circuitry 304 of the baseband chip 300, and the pre-processing circuitry 105 may be configured to receive the one or more scaling factors from the baseband chip 300 via the digital interface 102. Thus, the baseband chip 300 may comprise control circuitry configured to determine the one or more scaling factors and to transmit the determined one or more scaling factors to the pre-processing circuitry 105 of the DPPC via the digital interface.

Still further, in some embodiments, the pre-processing circuitry 105 further comprises beam tracking circuitry 115 configured to perform beam tracking on the RX digital signals and TX digital signals. Thus, the beam tracking circuitry 115 may be configured to dynamically calculate the direction in which a signal is sent or from which the signal is received in order to track an end-point/target (e.g. to track a UE if the multi-antenna transceiver system 10 is employed in a base station or other network node).

In some embodiments, the pre-processing circuitry further comprises Fast Fourier Transform processing circuitry (FFT/IFFT) 117 configured to transform the plurality of RX digital signals from time domain signals to frequency domain signals. The Fast Fourier Transform processing circuitry 114 is further configured to transform the plurality of TX digital signals from frequency domain signals to time domain signals. In other words, in general, the Fast Fourier Transform processing circuitry 117 is a functional component configured to compute the discrete Fourier transform (DFT) or inverse (IDFT) of a sequence of values.

Stated differently, the pre-processing circuitry 105 may comprise Discrete Fourier Transform circuitry (DFT/FFT, inverse DFT/FFT), configured to transform a time domain digital signal to a frequency domain digital signal on the receiver (RX) side, or vice versa on the transmitter (TX) side. Thereby, frequency domain signals may be transmitted over the digital interface 102 to the baseband chip 300. In some embodiments, the Fast Fourier Transform processing circuitry 117 may be placed prior to the first and second scaling circuitry 113a, 113b, "prior" being in reference to a respective signal path. However, in some embodiments, the Fast Fourier Transform processing circuitry 117 may be placed after to the first and second scaling circuitry 113a, 113b, "after" being in reference to a respective signal path. However, in the embodiments where the Fast Fourier Transform processing circuitry 117 is placed prior to the "scaling", the scaling may be different for different frequency sub-carriers.

Yet further, in some embodiments, the pre-processing circuitry 105 further comprises resource block selection circuitry 116 configured to extract a subset of a total number of resource blocks for transmission via the digital interface. In other words, the resource block selection circuitry is configured to extract/select a subset of the frequency domain signal to be transported over the digital interface 102 to the baseband chip 300. The subset may for example be a single or a few resource blocks out of a total number of 100 or more resource blocks.

It should be noted that a resource block corresponds to a set of sub-carriers, where a set, as mentioned, is to be understood as one or more. Thus, a resource black may correspond to a single sub-carrier (i.e. one-to-one mapping) or a plurality of sub-carriers (e.g. 12 consecutive subcarriers in the frequency domain for 5G-NR). Thus, the term "configured to extract a subset of a total number of resource blocks for transmission via the digital interface" may in some embodiments be understood as "configured to extract a subset of a total number of sub-carriers for transmission via the digital interface".

Moreover, the resource block selection circuitry 116 may be configured to receive a signal, from the baseband chip 300, where the signal is indicative of a resource block selection or a sub-carrier selection (i.e. of the subset of resource blocks or sub-carriers for transmission via the digital interface). In more detail, the baseband chip 300 may comprise control circuitry 300 configured to determine the resource block selection or sub-carrier selection based on a decoding of a received control channel.

As mentioned in the foregoing, the digital pre-processing chip 100 may further comprise control circuitry 120 and a control interface 107. The control circuitry 120 may accordingly be configured to transmit control signals to the plurality of analog RF chips 200 via the control interface 107. Each analog RF chip 200 is accordingly provided with a corresponding control interface (CIF) for receiving the control signals transmitted by the digital pre-processing chip 100. The control interfaces (CIF) 107 may be in the form of a digital interface and/or a Serial-to-Parallel interface (SPI). In some embodiments, the control circuitry 120 is configured to receive control signals from the baseband chip 300 via the digital interface 102, and to transmit the received control signals to the plurality of analog RF chips 200 via the control interface 107.

Moving on, in some embodiments, the pre-processing circuitry 105 further comprises RF calibration circuitry (RFCC) 118 configured to transmit calibration data for the plurality of analog RF chips 200 to the control circuitry 120, which in turn is configured to transmit control signals indicative of the calibration data to the plurality of analog RF chips 200 via the control interface 107. In other words, the RFCC 118 is configured to generate calibration data and send the calibration data to the control circuitry 120 of the DPPC 100, which in turn transmits control signals indicative of the generated calibration data to the analog RF chips 200 via the control interface 107.

Further, in some embodiments, the calibration data is indicative of at least one of mixer and/or baseband quadrature error-correction parameters for the transmitter blocks and/or receiver blocks of the analog RF chips 200, receiver linearity enhancement parameters, and transmitter linearity and efficiency enhancement parameters. The mixer and/or baseband quadrature error-correction parameters may be in reference to a Cartesian domain or a polar domain. Moreover, the receiver linearity enhancement parameters may include one or more parameters for cancelation of intermodulation, blocker suppression/filtering, and compression point boosting. The transmitter linearity and efficiency enhancement parameters may include one or more parameters for peak-to-average-power-ratio (PAPR) reduction, amplitude-to-amplitude (AM-AM) and amplitude-to-phase (AM-PM) reduction, and power amplifier (PA) efficiency enhancement.

Furthermore, in some embodiments, the control circuitry 120 of the DPPC is configured to receive monitoring control signals from each of the analog RF chips 200 via the control interface 107. For example, in reference to process monitoring, such as e.g. for Process-Voltage-Temperature (PVT) monitoring, the monitoring control signals may be sent from the analog RF chips 200 to the digital pre-processing chip 100. The data conveyed with the monitoring control signals may be collected on the analog RF chips with an on-chip calibration multiplexer (MUX) provided on each analog RF chip 200 (not shown).

Furthermore, in some embodiments, the received monitoring control signals are indicative of signals strengths and/or linearity of the transceiver block 212 (i.e. of both the transmitter and receiver blocks) of the analog RF chips. Thus, the monitoring control signals may be indicative of one or more of a Received Signal Strength Indicator (RSSI), a Transmit Signal Strength Indicator (TSSI), and a Baseband Signal Indicator (BBSI).

Still further, in some embodiments, the control signalling from the analog RF chips 200 (i.e. the monitoring control signals) are passed through the digital pre-processing chip 100 to the baseband chip 300. In more detail, the control signalling from the analog RF chips 200 (i.e. the monitoring control signals) may be multiplexed in the DPPC 100 together with other digital signals to be transmitted over the same digital interface 102 to the baseband chip 300.

It should be noted that the various functional blocks (such as e.g. the beam tracking circuitry 115, the estimating circuitry 114, the RF calibration circuitry 118, etc.) are illustrated as independent functional blocks. However, as the skilled person readily understands, these functional blocks may be combined into one or more blocks depending on specific realizations and implementations, and that their independency in the appended drawings are not to be construed as limiting to specific illustrated embodiments, but to facilitate the understanding of the teachings herein. For example, as mentioned, the pre-processing circuitry 105 may comprise radio channel estimator circuitry 112 configured to estimate a radio channel for each RX digital signal. Then, based on the estimated radio channel, the scaling factors may be determined, for instance in the beam tracking circuitry (as opposed to a dedicated estimating circuitry). Alternatively, the scaling factors may be determined by a combined beam tracking circuitry and RF calibration circuitry.

Further, in accordance with an aspect of the present disclosure, there is provided a digital pre-processing chip comprising an analog interface for transmitting and receiving analog signals to and from a plurality of analog RF chips, and a digital interface for transmitting and receiving digital signals to and from a baseband chip. The digital pre-processing chip further comprises a control interface for transmitting and receiving (digital) control signals to and from the plurality of RF chips. The digital pre-processing chip may further comprise any one or more of the features/components as described herein.

Moreover, the baseband chip may be comprised in/by the digital pre-processing chip forming an extended baseband chip. Accordingly, in accordance with another aspect of the present disclosure, there is provided an extended baseband chip comprising an analog interface for transmitting and receiving analog signals to and from a plurality of analog RF chips, and a (separate) control interface for transmitting and receiving (digital) control signals to and from the plurality of RF chips. The extended baseband chip accordingly further comprises one or more of the features/components of the digital pre-processing chip as described herein. Thus, in some embodiments there is provided an extended baseband chip comprising the DPPC in accordance with any one of the embodiments disclosed herein, except for the digital interface for transmitting and receiving signals to/from an external baseband chip.

FIG. 4 is a schematic illustration of a network node 51 (here in the form of a base station 51) and a set of wireless communication devices 52 (here in the form of mobile communication devise 52), each of which comprises a multi-antenna transceiver system 10 in accordance with any one of the embodiments disclosed herein. In other words, the embodiments disclosed herein may appear within an electronic apparatus (such as a wireless communication device 52 or a network node 51) comprising arrangements, circuitry, and/or logic according to any of the embodiments described herein.

Although the description may be given for a wireless communication device (may also be referred to as a user equipment, wireless device or terminal), in very general forms, it should be understood by the skilled in the art that "wireless communication device" is a non-limiting term which means any wireless device, terminal, or node capable of receiving in DL and transmitting in UL (e.g. PDA, laptop, mobile, sensor, fixed relay, mobile relay or even a radio base station, e.g. femto base station). The term wireless communication device, as used herein, also encompasses Internet of Things (IOT) devices such as smart sensors, smart appliances, etc.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

It should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. This has however already been exemplified in the foregoing.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A digital pre-processing chip comprising:
    an analog interface for transmitting and receiving analog signals to and from one or one analog Radio Frequency, RF, chips;
    a digital interface for transmitting and receiving digital signals to and from a baseband chip;
    a plurality of Analog-to-Digital Converters, ADCs, for converting a plurality of analog signals received via the analog interface to a plurality of RX digital signals;
    a plurality of Digital-to-Analog Converters, DACs, for converting a plurality of TX digital signals to a plurality of analog signals to be transmitted to the one or more analog RF chips (200) via the analog interface;
    pre-processing circuitry configured to:
        pre-process the plurality of RX digital signals received from the plurality of ADCs to form a pre-processed digital signal to be transmitted to the baseband chip via the digital interface; and
        pre-process a digital signal received via the digital interface to form the plurality of TX digital signals to be transmitted to the plurality of DACs;
    wherein the pre-processing circuitry comprises:
        radio channel estimating circuitry (RCE) configured to estimate a radio channel for a respective RX digital signal obtained from the plurality of ADCs;
        a first scaling circuitry configured to perform a first scaling of the plurality of RX digital signals received from the plurality of ADCs; and
        a second scaling circuitry configured to perform a second scaling of the plurality of TX digital signals; and
    estimating circuitry configured to:
        determine at least one scaling factor based on the estimated radio channels; and
        estimate the first scaling and the second scaling based on the at least one scaling factor.

2. The digital pre-processing chip according to claim 1, wherein the pre-processing circuitry further comprises:
    combining circuitry configured to combine the plurality of RX digital signals received from the plurality of ADCs to form the pre-processed digital signal; and
    splitting circuitry configured to split the digital signal received via the digital interface to the plurality of TX digital signals to be transmitted to the plurality of DACs.

3. The digital pre-processing chip according to claim 1, wherein the first scaling is different from the second scaling.

4. The digital pre-processing chip according to claim 1, wherein the first scaling is the same as the second scaling.

5. The digital pre-processing chip according to claim 1, wherein the pre-processing circuitry further comprises at least one of:
    Fast Fourier Transform, FFT, processing circuitry configured to:
        transform the plurality of RX digital signals from time domain signals to frequency domain signals; and
        transform the plurality of TX digital signals from frequency domain signals to time domain signals;
    radio channel estimator circuitry configured to estimate a radio channel for each RX digital signal;
    beam tracking circuitry configured to perform beam tracking on the RX digital signals and TX digital signals;
    resource block selection circuitry configured to extract a subset of a total number of resource blocks for transmission via the digital interface.

6. The digital pre-processing chip according to claim 1, further comprising control circuitry and a control interface, and wherein the control circuitry is configured to:
    transmit control signals to the one or more analog RF chips via the control interface.

7. The digital pre-processing chip according to claim 6 wherein the control interface comprises at least one of a digital interface and a Serial-to-Parallel Interface, SPI.

8. The digital pre-processing chip according to claim 6, wherein the pre-processing circuitry further comprises RF calibration circuitry (118) configured to:
    transmit calibration data for the one or more analog RF chips to the control circuitry; and
    wherein the control circuitry is configured to transmit control signals indicative of the calibration data to the one or more analog RF chips via the control interface.

9. The digital pre-processing chip according to claim 8, wherein the calibration data is indicative of at least one of:
    mixer and/or baseband quadrature error-correction parameters for the transmitters and/or receivers of the one or more analog RF chips; and
    receiver linearity enhancement parameters;
    transmitter linearity and efficiency enhancement parameters.

10. A multi-antenna transceiver system comprising:
    one or more analog RF chips;
    a baseband chip; and
    at least one digital pre-processing chip according to claim 1 wherein each digital pre-processing chip is configured to:
        transmit and receive analog signals to and from a set of the one or more analog RF chips via the analog interface; and
        transmit and receive digital signals to and from the baseband chip via the digital interface.

11. A network node comprising the multi-antenna transceiver system according to claim 10.

12. A wireless communication device comprising the multi-antenna transceiver system according to claim 10.

13. The wireless communication device according to claim 12, wherein the wireless communication device is a mobile communication device.

* * * * *